United States Patent [19]

Eikelboom

[11] Patent Number: 4,844,007

[45] Date of Patent: Jul. 4, 1989

[54] DEVICE FOR PROVIDING GLASS LAYERS ON THE INSIDE OF A TUBE

[75] Inventor: Herman W. Eikelboom, Eindhoven, Netherlands

[73] Assignee: U.S. Philips Corporation, New York, N.Y.

[21] Appl. No.: 116,416

[22] Filed: Nov. 2, 1987

[30] Foreign Application Priority Data

Nov. 17, 1986 [NL] Netherlands ............... 8602910

[51] Int. Cl.[4] ............................................. C23C 16/00
[52] U.S. Cl. ...................................... 118/723; 118/715
[58] Field of Search .............................. 118/715, 723

[56] References Cited

U.S. PATENT DOCUMENTS 4,714,589 12/1987 Auwerda ..................... 427/39

Primary Examiner—Richard Bueker
Attorney, Agent, or Firm—Norman N. Spain

[57] ABSTRACT

A device for providing glass layers on the inside of a tube according to the PCVD process. In this process a microwave resonator is reciprocated along a tube. The resonator, on the side facing the tube, is provided partly with a heat-insulating layer. Said layer may consist of $SiO_2$, $Al_2O_3$, $TiO_2$ or MgO.

2 Claims, 1 Drawing Sheet

DEVICE FOR PROVIDING GLASS LAYERS ON THE INSIDE OF A TUBE

BACKGROUND OF THE INVENTION

The invention relates to a device for providing glass layers on the inside of a tube, comprising a gas supply device which is connected to one end of the tube, a furnace for heating the tube, a resonator comprising a resonant cavity for generating a plasma in the tube, and means to move the resonator and the tube relatively with respect to each other, a high-frequency generator which is connected to the resonant cavity and a vacuum pump which is connected to the opposite end of the glass tube.

Such a device is disclosed, for example, in European Patent Application No. 0129129. In this known device means are present to rotate the tube during the deposition according to a given scheme. Devices of this type are used to manufacture preforms for drawing optical fibres.

One method to increase the deposition rate is to increase the power supplied to the plasma and the quantity of gases supplied to the tube per unit of time for the formation of glass layers. However, the heat radiation per surface unit by the plasma also increases. An imperative condition for the perfect performance of the so-called non-isothermal plasma CVD process for the manufacture of optical fibres is that the temperature in the space enclosed by the tube is maintained at a temperature below the temperature at which the homogeneous reaction occurs in the gas in the tube. In practice the temperature of the tube is maintained below 1200° C. If a homogeneous reaction occurs, glass soot particles are formed in the gaseous phase and are incorporated in the glass layers which are formed simultaneously by a heterogeneous reaction. Then a clear glass layer is not obtained. Another problem, which is playing a more and more important role, is that upon increasing the power dissipated in the plasma and the greater heat radiation per unit of surface by the plasma associated therewith is the non-uniform heating of the tube by the plasma over the length of the tube and in time. That such a non-uniform heating of the tube by the plasma is bound to occur can easily be explained.

Between the reversal points of the plasma in the tube there is a point where the plasma passes after equal periods of time. On the left and on the right of this point time differences occur between successive passages of the plasma. Furthermore, at the reversal points of the movement of the plasma a velocity delay occurs as a result of which the relative residence of the plasma and hence the heat radiation per surface unit is increased at that area. A further complication is that the plasma is not present symmetrically within the resonant cavity with respect thereto but generally is shifted with respect to the resonant cavity in the direction of the vacuum pump. Moreover, the heat radiation per surface unit by the plasma over the length of the plasma is not equal.

SUMMARY OF THE INVENTION

It is the object of the invention to provide measures which may be used as an effective means to control the thermal load of the tube by the plasma when the plasma power is increased.

According to the invention, this object is achieved by means of a device of the type described in the opening paragraph which is characterized in that the resonator comprises a cooled body comprising a duct for receiving the tube, of which body at least the duct wall consists of a readily heat-conducting metal and in which the wall of the duct facing the tube is provided with a heat-insulating layer over that part within which during operation of the device less than 40% of the maximum quantity of thermal energy per surface unit is delivered by the plasma in the tube.

DETAILED DESCRIPTION OF THE INVENTION

The invention will now be described in greater detail with reference to the accompanying drawing.

Figure 1:
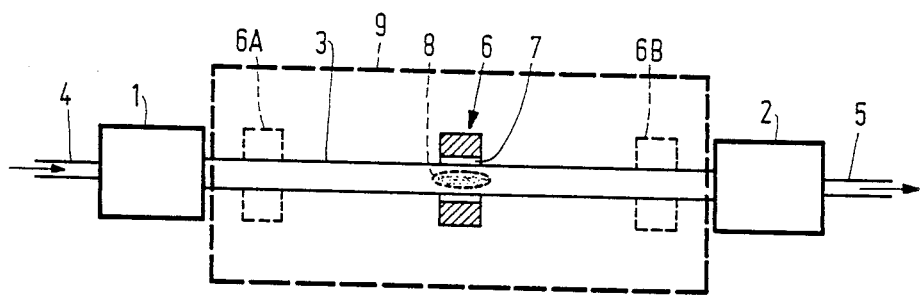
FIG. 1 is a diagrammatic view of a device for depositing glass on the inside of a tube employing a resonator of the invention.

The part of the device shown in FIG. 1 comprises two rotatable gas lead-throughs 1 and 2 which rotate synchronously with each other continuously or in steps. The tube 3 is clamped between the heads 1 and 2 during operation of the device. The ends of the tube 3 are connected at 4 and 5 to a gas supply device and a vacuum pump, respectively (both not shown). The device furthermore comprises a resonator 6 shown in detail in FIG. 2 having a duct 7 which comprises the tube 3 and the resonant cavity for generating the plasma 8 in the tube. 6A and 6B denote the extreme positions of the resonator 6 during the reciprocating movement (device for movement, connection to the high-frequency generator and the high-frequency generator are not shown). A furnace 9 which is shown diagrammatically by broken line surrounds the tube 3.

It will be seen that in the proximity of the reversal points 6A and 6B the time variation between the two passages may approach 0. The time variation to the next two passages between which the time variation approaches 0 depends on the length of the tube between the reversal points and the velocity at which the body 6 is moved along the tube. In the central position the time variations between the passages are approximately equal.

Figure 2:
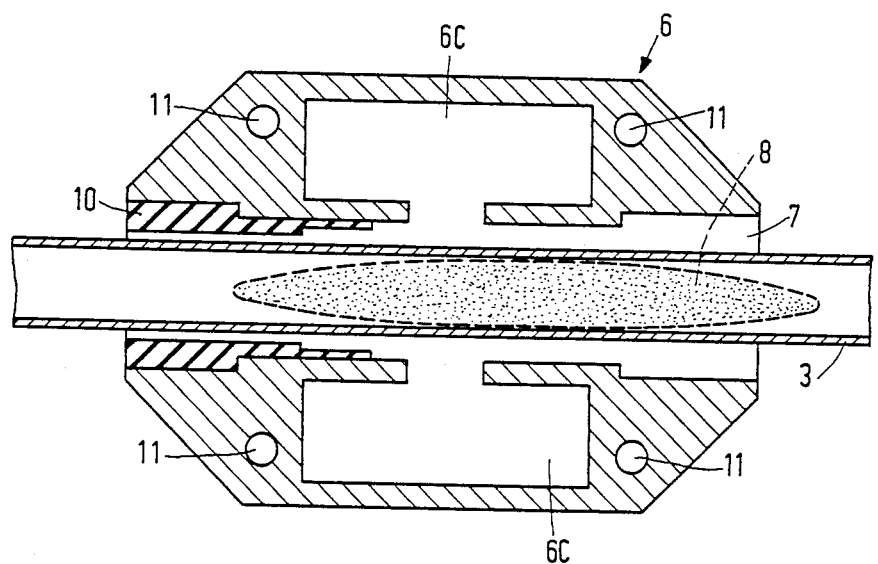
FIG. 2 is a cross-sectional view of a resonator of the invention and a part of the tube.

As shown in FIG. 2, the resonator 6 is cylindrical and encloses a duct 7 for receiving the tube 3 and a resonant cavity 6C. The resonant cavity 6C is connected to a high-frequency generator, not shown, via a waveguide (not shown). It is also shown in FIG. 2 that the plasma 8 is shifted with respect to the resonant cavity 6 in the direction of the gas outlet (direction arrow). The part of the duct 7 within which the plasma delivers less than 40% of the maximum thermal radiation per surface unit, or in other words where the thermal flux is smaller than 40% of the maximum thermal flux, is coated with a layer 10 of a heat-insulating and/or heat-reflecting material in the form of a layer of fibres or grains, for example of $SiO_2$, $Al_2O_3$, $TiO_2$, $MgO$ or mixtures of these substances.

At the reversal point 6B in FIG. 1 the heating by the plasma of the tube is relatively highest, in this case the cooling capacity of the resonator 6 is also highest. On the side of the reversal point 6A the thermal radiation is lower, in this case the cooling capacity of the resonator 6 is reduced by the presence of heat-insulating layer 10. All this leads to a more uniform heat distribution along the tube. The resonator 6 is cooled via cooling water ducts 11. The resonator body may consist, for example, of aluminum, copper, brass, steel, silver, gold or platinum.

What is claimed is:

1. A device for providing glass layers on the inside of a tube, comprising a gas supply device which is connected to one end of the tube, a furnace for heating the tube, a resonator comprising a resonant cavity for generating a plasma in the tube, said plasma being capable of delivering thermal energy to the tube in a quantity ranging from a maximum to less than 40% of the maximum, and means to move the resonator and the tube relatively with respect to each other, a high-frequency generator which is connected to the resonant cavity, and a vacuum pump which is connected to the opposite end of the tube, characterized in that the resonator comprises a cooled body comprising a duct for receiving the tube, of which body at least the wall of the duct consists of a readily heat-conducting metal and in which the wall of the duct facing the tube comprises a heat-insulating layer over only that part within which during operation of the device less than 40% of the maximum quantity of thermal energy is delivered by the plasma in the tube.

2. A device as claimed in claim 1, characterized in that the heat-insulating layer consists of fibres and/or grains of one or more substances from the group consisting of $SiO_2$, $Al_2O_3$, $TiO_2$ and $MgO$.

* * * * *